March 21, 1950     O. L. TAYLOR     2,501,361
SPEED-TORQUE CONTROL FOR WOUND-ROTOR INDUCTION MOTORS
Filed Sept. 27, 1947     2 Sheets-Sheet 1

WITNESSES:
Robert C Baird
W. C. Groome

INVENTOR
Owen L. Taylor.
BY
Paul E. Friedemann
ATTORNEY

Patented Mar. 21, 1950

2,501,361

UNITED STATES PATENT OFFICE 2,501,361

SPEED-TORQUE CONTROL FOR WOUND-ROTOR INDUCTION MOTORS

Owen L. Taylor, Pittsburgh, Pa., assignor to Westinghouse Electric Corporation, East Pittsburgh, Pa., a corporation of Pennsylvania Application September 27, 1947, Serial No. 776,452

6 Claims. (Cl. 318—237)

My invention relates to electric systems of control and more particularly to systems for controlling the speed of operation of wound rotor induction motors.

One of the broad objects of my invention is to provide for selecting any speed between zero speed and synchronous speed for a wound rotor induction motor and to provide for maintaining the speed selected constant regardless of changes in mechanical load on the motor shaft.

A still broader object of my invention is the provision of a constant speed induction motor, the speed of which is, within certain load variations, unaffected by variations in load.

A more specific object of my invention is the provision of electronic control means in the external circuit of the secondary winding of a wound rotor induction motor for controlling the magnitude of the current in the secondary windings.

A still more specific object of my invention is the provision of grid controlled electronic devices connected across the phases of the secondary windings of a wound-rotor induction motor, and the provision of means responsive to the load currents in the phases of the primary windings for controlling the bias on the grids of each of the electronic devices in the secondary circuit.

The objects stated are merely representative of many other objects and advantages of my invention, which other objects and advantages will become more apparent from a study of the following specification and the drawing forming part of the specification. In the drawing.

Figure 1:
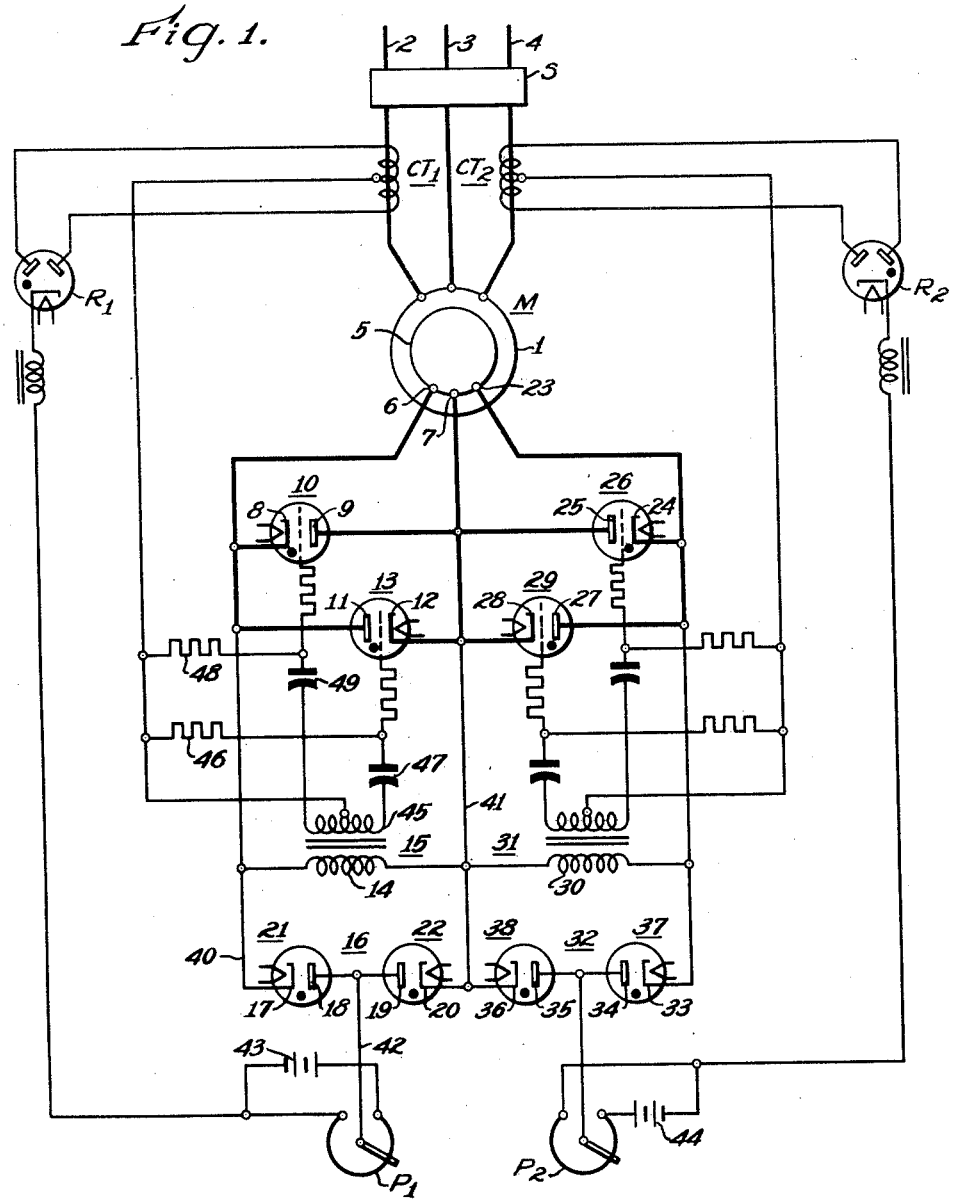
Figure 1 is a diagrammatic showing of my invention as applied to a wound-rotor induction motor.

In Fig. 1, M designates a wound-rotor induction motor having its three-phase primary winding 1, or stator, connected to buses 2, 3 and 4 through a suitable starting control S. The three-phase secondary winding 5 has the terminals 6 and 7 connected respectively to the cathode 8 and anode 9 of the gas-filled grid controlled discharge tube 10, the anode 11 and cathode 12 of the gas-filled grid controlled discharge device 13, the primary winding 14 of the high impedance transformer 15, and to the terminals of the series circuit 16. This series circuit 16 comprises the cathode 17 and anode 18 of the rectifier unit 21 and the anode 19 and cathode 20 of the rectifier unit 22.

The terminals 23 and 7 of the secondary windings 5 are connected respectively to the cathode 24 and anode 25 of the gas-filled grid-controlled discharge device 26, the anode 27 and cathode 28 of the gas-filled grid-controlled discharge device 29, the primary winding 30 of the high impedance transformer 31, and to the terminals of the series circuit 32. This series circuit 32 comprises the cathode 33 and anode 34 of the rectifier unit 37 and the anode 35 and cathode 36 of the rectifier unit 38.

The rectifier units 21 and 22, and 37 and 38 may be of any suitable type. It is not necessary that they be of the electronic type shown. The essential feature is that when conductor 40 is positive with respect to conductor 41, rectifier unit 22 is conducting and conductor 42 is at the same, or zero, potential of conductor 41. Similarly, when conductor 41 is positive with respect to conductor 40 then rectifier unit 21 is conducting and conductors 40 and 42 are at the same potential. The rectifier units 37 and 38 function similarly.

By suitably controlling the breakdown of the tubes 10, 13, 26 and 29, the speed of motor M may be effectively controlled. I accomplish this by controlling the value of the current flow in the external circuit of the secondary winding. The tubes are arranged so as to conduct alternating current and when firing act as a short-circuit across the terminals 6, 7 and 23.

The control of the speed of a wound-rotor induction motor by the insertion of impedance in the position of the above-mentioned tubes is well-known in the art. The tubes are thus a species of impedance wherein the average current is determined by controlling the instant the tube breaks down and conducts current.

The firing of the discharge devices is controlled by the grids of these devices. The adjustment and selection is such that the tubes will fire when the anode is positive with respect to the cathode and the grid is positive, or less than a few volts negative, with respect to the cathode.

It is necessary to control the firing time of these tubes by the use of a direct-current bias due to the fact that the frequency of the current passed by these tubes may vary from zero to line frequency. The direct-current bias for the four tubes 10, 13, 26 and 29 is provided by the sources of direct current 43 and 44, and the control is achieved by the use of the rectifying units 21, 22, 37 and 38.

Figure 2:
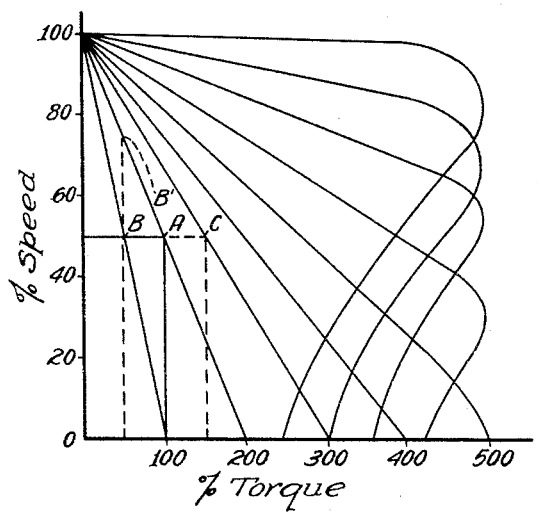
Fig. 2 shows a plurality of speed torque curves of a typical wound-rotor induction motor.

For the purpose of understanding my invention, it will suffice if I confine my discussion to one phase of the three-phase secondary winding 5. Let the assumption be that the motor M is running at 100% torque and 50% of full speed. Notice point A in Fig. 2. This means that the firing angle of the tubes 10, 13, 26 and 29 has been so selected that the average current is the same as if sufficient impedance had been inserted in the secondary circuit to allow just sufficient current to flow to operate at point A on the 200% locked rotor torque curve.

If the load should for any reason change from the 100% torque to 50% torque then, assuming conventional resistors in the secondary circuit, the motor speed would rise to 75% speed or to point B' on the 200% locked rotor torque curve. By increasing the resistance value of the secondary circuit, the operation of the motor can be shifted to operate at point B on the 100% locked rotor torque curve. The speed will thus drop back from the 75% speed to the 50% speed. The same speed is thus attained but with a different torque.

I accomplish the same effect much more smoothly and gradually and above all automatically by delaying the instant of firing of the tubes 10, 13, 26 and 29 so that the average current in the secondary circuit is the same as if more resistance had been inserted. The control is such that the changes in the firing time is made a function of the load current.

Figure 3:
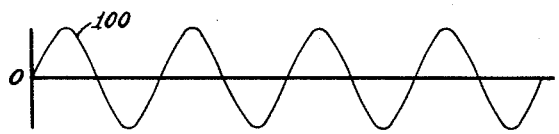
Figs. 3, 4, 5, 6 and 7 show some curves facilitating the disclosure of my invention.
Figure 4:
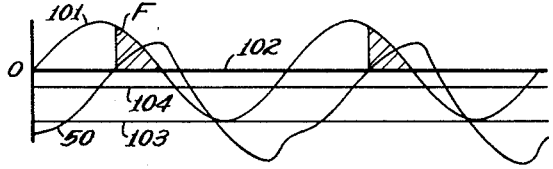
Figure 5:
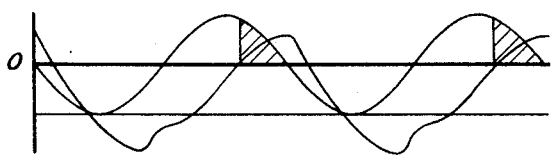

Fig. 3 shows the curve 100 for the voltage and frequency of the alternating current being supplied to the primary winding. Fig. 4 shows the rotor volts curve 101 at 50% of full speed. Let this be the representation of the voltage of anode 11 of tube 13 and that the voltage of the cathode 12 be the zero line, or reference line 102. The direct-current speed control bias is obtained by using a potentiometer $P_1$ to select a given direct-current voltage obtained from the output of the battery 43. This voltage shown by curve 103, is selected to be negative with respect to the cathode 12.

The current flow in the primary winding of the motor, which current is a measure of the torque, produces a voltage on the terminals of the secondary of the current transformer $CT_1$, that is proportional to the load current. This voltage I rectify by the rectifying means $R_1$, and so apply that its value, represented by curve 104, is subtracted from curve 103.

The primary winding 14 of the transformer 15 is connected to the terminals 6 and 7 and the output of the secondary winding 45 is shifted 90° in phase for one half cycle by the resistor 46 and capacitor 47 and for the other half cycle by the resistor 48 and capacitor 49. The transformer 15 is so connected that its output is added to the curves 103 and 104. The sum of the output and curves 103 and 104 is represented by curve 50. From this analysis it will be apparent that, say tube 13 will fire at point F for one setting of potentiometer $P_1$ and one particular value of armature current.

Figure 6:
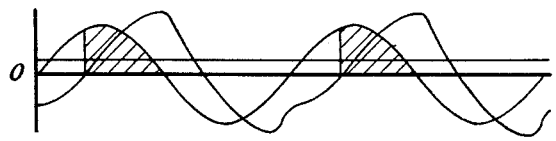
Figure 7:
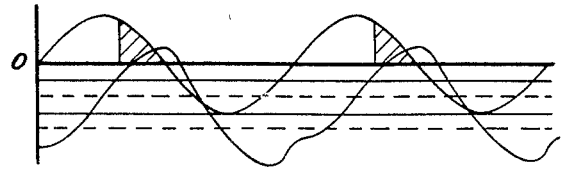

If the torque rises, namely the armature current rises, then tube 13 will fire earlier. The speed will not drop but instead the operation will be as if less resistance had been placed in the secondary circuit. The operation will thus change from point A to point C, see Figs. 2 and 6. If the torque decreases, the tube 13 will fire later and the effect will be as if more resistance had been put in the secondary circuit. See Figs. 2 and 7.

For the second half cycle, tube 10 takes over. The arrangement for the other phases of the secondary winding 5 is the same, namely, secondary $CT_2$ is energized, tubes 26 and 29 fire alternately subject to the speed control potentiometer $P_2$, the output of rectifier $R_2$, and the output of transformer 31.

Both the transformers 15 and 31 are of the high impedance type and thus do not materially affect the control despite the fact these transformers are load units in the secondary circuit of the motor.

I have shown a pair of tubes, as tubes 10 and 13, connected to terminals 6 and 7 and a pair of tubes, as tubes 26 and 29, connected to terminals 7 and 23, but I do not show a similar pair of tubes connected to terminals 6 and 23. Obviously, such third pair of tubes could be shown and would have the advantage of balancing the load in the circuits of the secondary 5. The use of three pairs of tubes is well within the scope of my invention but to add the additional pair of tubes complicates the showing and, from a practical point of view, is seldom justified. The cost of a control with two pairs of tubes is considerably less than would be the cost of the control with three pairs of tubes yet two pairs are usually good enough in practice.

While I have shown but one circuit arrangement, I do not wish to be limited to the exact showing made but wish to be limited only by the scope of the claims hereto appended.

I claim as my invention:

1. In a control for a wound-rotor induction motor, in combination, a motor primary winding, means for connecting the primary winding to be energized with alternating current, a wound-rotor secondary winding for the motor, an electron discharge device having an anode, a control grid, and a cathode, the anode being connected to one terminal of the secondary winding and the cathode being connected to the other terminal of the secondary winding, a source of direct-current bias for the grid, means for adjusting the direct-current grid bias effect to a selected value, means responsive to the secondary potential for producing an effect on the grid bias, and means coacting with said first two biasing means and responsive to primary load current for controlling the grid bias.

2. In a control for a wound-rotor induction motor, in combination, a motor primary winding; means for connecting the primary winding to be energized with alternating current; a wound-rotor multi-phase secondary winding; an electronic discharge device having an anode connected to one terminal of one phase of the secondary winding, a cathode connected to the other terminal of the said one phase of the secondary winding, and a control grid; a second similar electronic discharge device connected in an opposite sense to the said one phase of the secondary winding; means for controlling the time of firing of the first electronic device as a function of the primary current during each of the positive half cycles; means for controlling the time of firing of the second electronic device as a function of the primary current during each of the negative half cycles; a second pair of similar electronic devices connected in similar manner in a second phase of the secondary winding; and means for similarly effecting the alternate firing of the tubes of the second pair of tubes.

3. In a control for a wound-rotor induction motor, in combination, a motor primary winding; means for connecting the primary winding to be energized with alternating current; a wound-rotor multi-phase secondary winding; an electronic discharge device having an anode connected to one terminal of one phase of the secondary winding, a cathode connected to the other terminal of the said one phase of the secondary winding, and a control grid; a second similar electronic discharge device connected in an opposite sense to the said one phase of the secondary winding; control means responsive to the primary current, rectifying means for rectifying the current output of the control means to produce a direct current effect that is proportional to the primary current, and means responsive to said rectifying means for controlling the time of firing of the first electronic device as a function of the primary current during each of the positive half cycles; means responsive to the rectifying means for controlling the time of firing of the second electronic device as a function of the primary current during each of the negative half cycles; a second pair of similar electronic devices connected in similar manner in a second phase of the secondary winding; and means for similarly effecting the alternate firing of the tubes of the second pair of tubes.

4. In a control for a wound-rotor induction motor, in combination, a motor primary winding; means for connecting the primary winding to be energized with alternating current; a wound-rotor secondary winding; an electronic discharge device having an anode connected to one terminal of the secondary winding, a cathode connected to the other terminal of the secondary winding, and a control grid; a second similar electronic discharge device connected in an opposite sense to the secondary winding; control means responsive to the primary current, rectifying means for rectifying the current output of the control means to produce a direct current effect that is proportional to the primary current, and means responsive to said rectifying means for controlling the time of firing of the first electronic device as a function of the primary current during each of the positive half cycles; and means responsive to the rectifying means for controlling the time of firing of the second electronic device as a function of the primary current during each of the negative half cycles.

5. In a control for a wound-rotor induction motor, in combination, a motor primary winding; means for connecting the primary winding to be energized with alternating current; a wound-rotor multi-phase secondary winding; an electronic discharge device having an anode connected to one terminal of one phase of the secondary winding, a cathode connected to the other terminal of the said one phase of the secondary winding, and a control grid; a second similar electronic discharge device connected in an opposite sense to the said one phase of the secondary winding; control means including, first, a source of direct current, second, means responsive to the primary current, and, third, rectifying means for rectifying the current output of the means responsive to the primary current, whereby said control means produces a direct current effect that is a function of the potential of the source of direct current and the primary current, means for interconnecting said control means with the grids of said electronic discharge devices to thus provide means for controlling the time of firing of the first electronic device as a function of the primary current and said source of direct current during each of the positive half cycles; means for controlling the time of firing of the second electronic device as a function of the primary current and said source of direct current during each of the negative half cycles; a second pair of similar electronic devices connected in similar manner in a second phase of the secondary winding; and means for similarly effecting the alternate firing of the tubes of the second pair of tubes.

6. In a control for a wound-rotor induction motor, in combination, a motor primary winding; means for connecting the primary winding to be energized with alternating current; a wound-rotor secondary winding; an electronic discharge device having an anode connected to one terminal of the secondary winding, a cathode connected to the other terminal of the secondary winding, and a control grid; a second similar electronic discharge device connected in an opposite sense to the secondary winding; control means including, first, a source of direct current, second, means responsive to the primary current, and, third, rectifying means for rectifying the current output of the means responsive to the primary current, whereby said control means produces a direct current effect that is a function of the potential of the source of direct current and the primary current, means for interconnecting said control means with the grids of said electronic discharge devices to thus provide means for controlling the time of firing of the first electronic device as a function of the primary current and said source of direct current during each of the positive half cycles; and means for controlling the time of firing of the second electronic device as a function of the primary current and said source of direct current during each of the negative half cycles.

OWEN L. TAYLOR.

REFERENCES CITED

The following references are of record in the file of this patent:

UNITED STATES PATENTS

| Number | Name | Date |
|---|---|---|
| 1,411,862 | Meyer | Apr. 4, 1922 |
| 1,669,132 | Jump | May 8, 1928 |
| 2,179,569 | Young | Nov. 14, 1939 |
| 2,246,295 | Cook | June 17, 1941 |